F. G. FORD.
Flour and Meal Sifter.
No. 208,585. Patented Oct. 1, 1878.
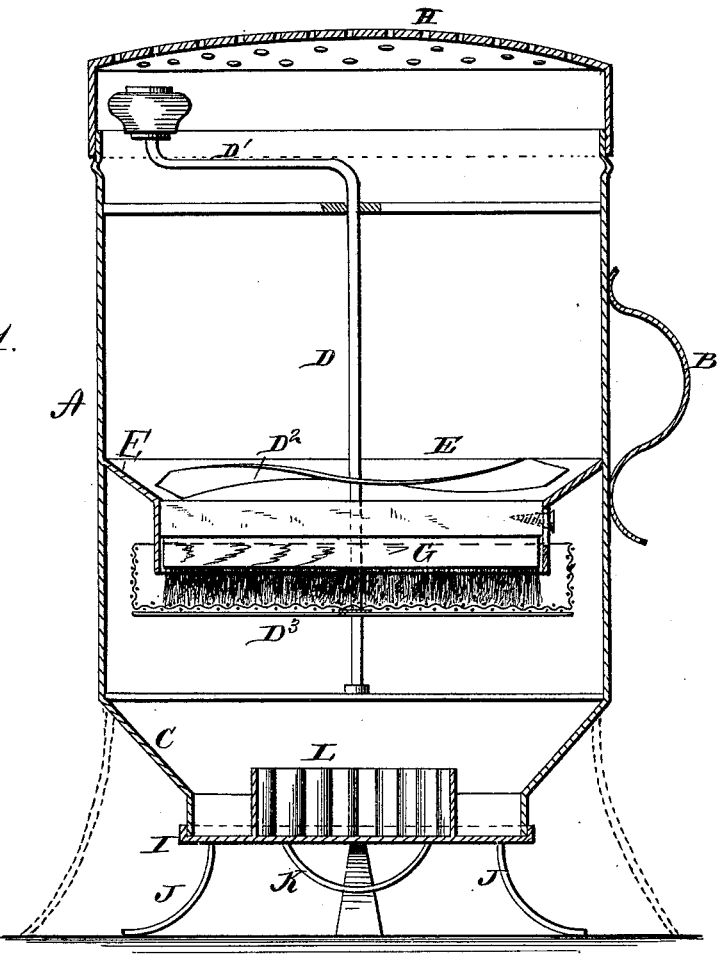
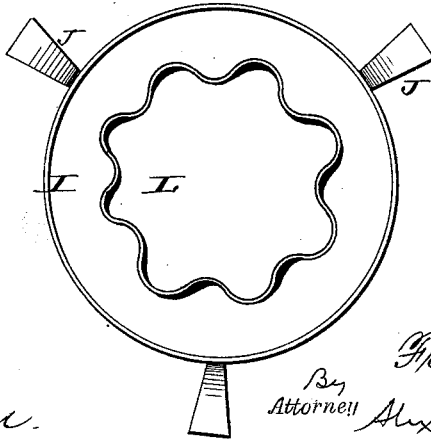

UNITED STATES PATENT OFFICE.

FREDERIC G. FORD, OF ROXBOROUGH, PENNSYLVANIA.

IMPROVEMENT IN FLOUR AND MEAL SIFTERS.

Specification forming part of Letters Patent No. 208,585, dated October 1, 1878; application filed August 17, 1878.

*To all whom it may concern:*

Be it known that I, FREDERIC G. FORD, of Roxborough, in the county of Philadelphia, and in the State of Pennsylvania, have invented certain new and useful Improvements in Flour and Meal Sifters; and do hereby declare that the following is a full, clear, and exact description thereof, reference being had to the accompanying drawings, and to the letters of reference marked thereon, making a part of this specification.

The nature of my invention consists in certain improvements upon the flour and meal sifter for which Letters Patent No. 178,131 were granted to me May 30, 1876, as will be hereinafter more fully set forth.

In order to enable others skilled in the art to which my invention appertains to make and use the same, I will now proceed to describe its construction and operation, referring to the annexed drawing, in which—

Figure 1 is a central vertical section of my improved flour and meal sifter. Fig. 2 is a plan view of the bottom thereof.

A represents a cylindrical vessel of any suitable dimensions, provided on one side with a handle, B, and having its lower end contracted or made tapering, as shown at C. D is the vertical shaft in the center of the cylinder, with crank D¹ at its upper end, said shaft being provided with the arms or wings D² and sieve D³ to revolve with it.

Within the cylinder is a contracted throat, E, with a stationary though adjustable brush, G, secured thereto.

The shaft with its attachments, the throat, and brush are all constructed substantially in the same manner as described in my former patent above referred to.

I provide the cylinder A with a perforated cover, H, which admits of the sifter being used as an ordinary dredge-box when required. I also provide the lower contracted end of the cylinder with a bottom, I, having suitable legs J J, as shown. This is of great advantage, as by attaching this bottom the sifter can be carried from place to place without danger of spilling any flour. It can be placed on a table or anywhere, the sifting carried on, and then the bottom removed and the sifted flour emptied in a pan or wherever needed.

As a matter of convenience, a cake-cutter, L, may be attached to the upper side of the bottom I, and a handle, K, be provided on the under side.

If desired, the legs J may be attached directly to the cylinder A, as indicated by dotted lines in Fig. 1, instead of to the bottom I, and then, by removing the bottom, the sifter may be placed in a pan and the sifting done directly into the same.

Having thus fully described my invention, what I claim as new, and desire to secure by Letters Patent, is—

A flour or meal sifter consisting of a cylinder, A, having contracted or tapering lower end C, sifting mechanism within the cylinder, and a removable bottom, I, with legs J, substantially as and for the purposes herein set forth.

In testimony that I claim the foregoing I have hereunto set my hand this 15th day of August, 1878.

FREDERIC G. FORD.

Witnesses:
FRANK GALT,
J. J. McCARTHY.